(12) United States Patent
Friedrich et al.

(10) Patent No.: US 7,837,785 B2
(45) Date of Patent: Nov. 23, 2010

(54) PROCESS FOR THE PREPARATION OF PIGMENT GRANULES AND THE USE THEREOF

(75) Inventors: Holger Friedrich, Krefeld (DE); Kai Bütje, Duisburg (DE); Udo Holtmann, Köln (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/789,074

(22) Filed: Apr. 23, 2007

(65) Prior Publication Data

US 2008/0257213 A1 Oct. 23, 2008

Related U.S. Application Data

(63) Continuation of application No. 11/784,055, filed on Apr. 5, 2007, now abandoned.

(30) Foreign Application Priority Data

Apr. 10, 2006 (DE) ........................ 10 2006 017 109

(51) Int. Cl.
| | |
|---|---|
| C08K 5/00 | (2006.01) |
| C09C 1/04 | (2006.01) |
| C09C 1/36 | (2006.01) |
| C09C 1/00 | (2006.01) |
| C09C 1/44 | (2006.01) |
| C04B 14/02 | (2006.01) |
| C04B 16/00 | (2006.01) |
| C04B 24/00 | (2006.01) |
| B05D 7/00 | (2006.01) |
| B32B 19/00 | (2006.01) |
| B32B 5/16 | (2006.01) |
| C09D 7/00 | (2006.01) |

(52) U.S. Cl. ................... 106/499; 106/287.35; 106/429; 106/430; 106/431; 106/436; 106/439; 106/445; 106/460; 106/472; 106/476; 106/712; 427/212; 427/218; 427/220; 428/357; 428/403

(58) Field of Classification Search ......... 106/429–431, 106/436, 439, 445, 460, 472, 476, 499, 712; 428/357, 403; 427/212, 218, 220
See application file for complete search history.

(56) References Cited

U.S. PATENT DOCUMENTS

| | | | |
|---|---|---|---|
| 4,264,552 A | 4/1981 | McMahon et al. | 264/117 |
| 4,702,116 A | 10/1987 | Gawol et al. | 73/865.6 |
| 4,810,305 A | 3/1989 | Braun et al. | 106/499 |
| 4,946,505 A | 8/1990 | Jungk | 106/712 |
| 5,035,748 A | 7/1991 | Burow et al. | 106/499 |
| 5,199,986 A | 4/1993 | Krockert et al. | 106/712 |
| 5,215,583 A | 6/1993 | Krockert et al. | 106/712 |
| 5,389,137 A | 2/1995 | Linde et al. | 106/281.1 |
| 5,484,481 A | 1/1996 | Linde et al. | 106/712 |
| 5,634,970 A | 6/1997 | Linde et al. | 106/437 |

(Continued)

FOREIGN PATENT DOCUMENTS

DE 31 32 303 2/1983

(Continued)

*Primary Examiner*—Anthony J Green
*Assistant Examiner*—Pegah Parvini
(74) *Attorney, Agent, or Firm*—Nicanor A. Kohncke

(57) ABSTRACT

The present invention relates to pigment granules and to a process for the preparation thereof and their use.

71 Claims, 1 Drawing Sheet

U.S. PATENT DOCUMENTS

| | | | | |
|---|---|---|---|---|
| 5,797,988 | A * | 8/1998 | Linde et al. | 106/472 |
| 5,976,238 | A * | 11/1999 | Erkens et al. | 106/479 |
| 6,079,644 | A | 6/2000 | Linde et al. | 241/3 |
| 6,270,566 | B1 | 8/2001 | Rademachers et al. | 106/712 |
| 6,284,035 | B1 * | 9/2001 | Reisacher et al. | 106/493 |
| 6,663,960 | B1 * | 12/2003 | Murakami et al. | 428/402 |
| 2003/0151029 | A1 * | 8/2003 | Hsu et al. | 252/500 |
| 2004/0143040 | A1 * | 7/2004 | Metz et al. | 524/88 |
| 2005/0126442 | A1 * | 6/2005 | Acs et al. | 106/410 |
| 2006/0018854 | A1 * | 1/2006 | Dumousseaux et al. | 424/63 |

FOREIGN PATENT DOCUMENTS

EP     0 424 896     5/1991

* cited by examiner

PROCESS FOR THE PREPARATION OF PIGMENT GRANULES AND THE USE THEREOF

This Application is a Continuation of prior application Ser. No. 11/784,055, filed Apr. 5, 2007 now abandoned; prior application Ser. No. 11/784,055 is hereby incorporated by reference as if fully set forth herein.

BACKGROUND OF THE INVENTION

1. Field of the Invention

The present invention relates to pigment granules and a process for the preparation thereof and their use.

2. Brief Description of the Prior Art

The processing of pigment granules requires milling of the pigments to give primary particles in order to achieve the optimum colour impression. The powders formed thereby produce a very large amount of dust and, owing to their finely divided nature, tend to adhere and stick in metering units. In the case of toxicologically hazardous substances, it is therefore necessary during processing to take measures for avoiding danger to man and environment from dusts which form. However, even in the case of safe inert substances, such as, for example, iron oxide pigments, avoidance of dust pollution is increasingly being desired by the market. Dust avoidance and improved metering based on good flow properties for achieving a qualitatively uniform colour impression on use in building materials and organic media is therefore the aim when handling pigments. This aim is achieved more or less by applying granulation processes to pigments. For example, pelletizing or spray granulation are used. In recent years, however, it has also been possible for briquetted and press granules increasingly to become established on the market. These granules are now very successful commercially.

In the case of pigments, the market requires in principle two conflicting properties when pigment granules are used: mechanical stability of the granule and good dispersing properties in the medium used. The mechanical stability is responsible both for good transport properties during transport between manufacturer and user and for good metering and flow properties during the use of the pigments. It is produced by strong adhesive forces and depends, for example, on the amount of binder or on the pressure during moulding by pressing. On the other hand, the dispersibility is influenced by thorough milling prior to granulation (wet and dry milling), by the mechanical energy during incorporation (shear forces) and by dispersants which immediately reduce the adhesive forces in the dry granules during incorporation into a medium. In the case of pigments, however, the use of larger amounts of dispersants is limited owing to the auxiliary/pigment cost ratio. Moreover, a high proportion of auxiliaries results in a corresponding reduction in the colour strength or scattering power. Since the colour strength variations are generally ±5%, for example when colouring building materials, the use of additives is also limited even if they simultaneously act as adhesion promoters and dispersants. Furthermore, the additives must not change the performance characteristics of the end products, such as, for example, building materials, plastics and finishes, in a disadvantageous manner, for example the compressive strength or the setting behaviour in the case of concrete, the compressive strength or abrasion resistance in the case of asphalt and the strength or the notched impact strength in the case of plastics, the elastic properties in the case of elastomers (polymers) and the rheological properties in the case of paints and finishes.

According to the prior art, for example, spray granulation (spray drying by means of a disc or nozzle) by the cocurrent or countercurrent method and pelletizing (mixer, fluidized-bed granulator, disc or drum) or compacting processes are suitable as production processes for pigment granules.

Granulation by spray drying starts from pigment suspensions with the use of binders. Appropriate processes are described in various patents. Water-soluble binders are predominantly used. Thus, organic substances, such as, for example, ligninsulphonates, formaldehyde condensates, gluconic acids and sulphated polyglycol ethers, are used as starting materials in DE 3 619 363 A1, EP 0 268 645 A1 and EP 0 365 046 A1, while inorganic salts, such as, for example, silicate and phosphate, are used as staring materials according to DE 3 918 694 A1 and U.S. Pat. No. 5,215,583 A1. A combination of spray granulation and pelletizing has also been described in EP 0 507 046 A1. In DE 3 619 363 A1 and EP 0 268 645 A1, the use of a compacting process is excluded.

EP 0 257 423 A1 and DE 3 841 848 A1 describe spray granulation with the use of polyorganosiloxanes as hydrophobic, lipophilic additives. The atomization drier mentioned generally leads to particle sizes which are too small and a large fine fraction. This means that a substantial proportion of the material from the drier is not obtained as directly usable granules but is first retained in the filter as a fine fraction and then has to be recycled to the process. The hydrophobing aftertreatment leads in the case of spray-granulated products to granules which are very free-flowing but produce an extremely large amount of dust.

EP 0 424 896 A1 discloses the preparation of low-dust fine granules in a production run in known intensive mixers. A low content of waxes in combination with emulsifier and wetting agents is used here by applying an aqueous dispersion. In general, water contents of 20 to more than 50% are obtained. These granules must first be dried and separated from oversize and undersize.

DE 31 32 303 A1 describes low-dust, flowable inorganic pigment granules which are mixed with binders becoming liquid under the action of heat (40 to 60° C.) and are granulated by a screen process with the use of a screening aid (pressure). About 10 to 20% of ihe throughput are obtained as a fine fraction of <0.1 mm.

EP 0 144 940 A1 discloses low-dust pigment granules which, starting from filter slurry, are mixed at 50 to 200° C. with about 50% of water by addition of 0.5-10% of surface-active substances and additionally mineral oil or waxes which become liquid, up to the smear point. The process takes place in intensive mixers, and possibly subsequent granulation and subsequent drying are also effected. Water is present in the end product in an amount of 10 to 15%, which is disadvantageous for incorporation into plastics.

Other processes, too, are limited in their application. Owing to drop formation, spray granulation requires the use of readily flowable, i.e. low-viscosity, suspensions. For the drying process, it is therefore necessary to evaporate a larger amount of water than in the case of the frequently usable fluidized-bed drying from highly pressed-out pigment filter pastes. This leads to higher energy costs. In the case of pigments prepared beforehand by calcination, spray granulation means an additional process step with high energy costs. Moreover, a larger or smaller proportion of fine material is obtained in the dust filter during the spray granulation which has to be recycled to the production.

DE 28 44 710 A1 describes the granulation of pigments in a fluidized bed with granulating auxiliaries, dry pigment powder being sprayed with water.

Pelletizing frequently also has disadvantages. Starting from pigment powder, it can be carried out in mixers with high turbulence, by the fluidized bed process or by disc and drum granulation. Common to all these processes is that the binder requirement, generally water, is high so that drying has to follow as an additional process step. Here too, granules of different sizes are obtained, particularly if insufficient binder is available for the amount of powder or the actual distribution is not optimum. A certain proportion of granules may then be too large, while on the other hand excessively small and therefore still dusting fractions are present. Classification of the granules formed with recycling of oversize and undersize is therefore required.

Disc granulation leads to a broad particle size spectrum of granules. Where this is undesirable owing to the poor dispersibility of particles which are too large, the granulation process has to be monitored by intensive monitoring by personnel and granule production has to be optimized by manual control of the amount of nuclei. Here too, classification with recycling of the oversize and undersize is usually effected.

DE 42 14 195 A1 discloses a process for colouring asphalt with inorganic pigment granules, in which oils are used as binders. This is a simple granulation process.

DE 196 38 042 A1 and DE 196 49 756 A1 describe inorganic pigment granules obtained from dry pigments, for example finished material, by mixing with one or more auxiliaries, compacting and further subsequent steps, such as comminution, screening and recycling of coarse and/or fine material. In the compacting step, compacting is effected with nip forces of 0.1 to 50 kN/cm. The granules obtained can be surrounded by an additional layer which serves for increasing the stability or as an aid in processing.

In DE 4 336 613 A1 and DE 4 336 612 A1 describe inorganic pigment granules obtained from dry pigments, for example finished material, by mixing with binders, compacting and further subsequent steps, such as crushing on a screen granulator and subsequent pelletizing on a rotating disc or in a rotating drum. In the compacting step, compacting is effected with nip forces of 0.1 to 15 kN/cm.

The granules prepared according to the teaching of DE 196 38 042 A1, DE 196 49 756 A1, DE 4 336 613 A1 and DE 4 336 612 A1 contain only the auxiliary or the auxiliaries which were added in the first process step to the pigment powder. Even if the granule particles are surrounded by an additional layer, they contain in their interior only the auxiliary or the auxiliaries which were added to the pigment powder in the first process step. The granule particles are composed in their interior of a homogeneous mixture of pigment and auxiliary or auxiliaries. However, it is known that auxiliaries which lead to very good dispersibility in an application medium on improvement of the product properties may be far less effective in another application medium, and in certain circumstances even incompatibility may be observed. Thus, for example, strongly hydrophobic auxiliaries may be advantageous in the case of incorporation into plastics or asphalt, while they lead to difficulties in the case of incorporation into aqueous emulsion paints or in the preparation of aqueous slurries, since the granules are only very poorly wetted with water. For this reason, the granules prepared according to the teaching of DE 19 649 756 A1, DE 4 336 613 A1 and DE 4 336 612 A1 are not simultaneously equally suitable for all application media. During the preparation, it would therefore have been necessary to add a plurality of auxiliaries which permit as good a processability as possible in all application media. This is not very expedient from the economic point of view and moreover the multiplicity of different additives may result in mutual incompatibilities. If granules are prepared from pigment mixtures according to the teaching of DE 19 649 756 A1, DE 4 336 613 A1 or DE 4 336 612 A1, a further disadvantage of these granulation processes is found. It is first necessary to prepare a mixture of the different pigments, which is then mixed with binders and other auxiliaries and further processed.

It was therefore an object of the present invention to provide a process which avoids the disadvantages described to date of compacting granulation when applied to inorganic or organic pigments and provides sufficiently stable, meterable, low-dust granules having good dispersibility in different application media.

SUMMARY OF THE INVENTION

This object was achieved by pigment granules which consist of a pressed or briquetted core and at least one outer layer applied by granulation, a) the core containing at least one organic or inorganic pigment or mixtures thereof and at least one auxiliary and b) the outer layer applied by granulation or the outer layers applied by granulation containing at least one—optionally pressed or briquetted—organic or inorganic pigment or mixtures thereof and the outer layer applied by granulation or the outer layers applied by granulation containing in each case at least one auxiliary and c) in the outer layer applied by granulation or the outer layers applied by granulation,
 1) at least one organic or inorganic pigment other than that in the pressed or briquetted core being present or
 2) at least one auxiliary other than that in the pressed or briquetted core being present or
 3) at least one organic or inorganic pigment other than that in the pressed or briquetted core being present and at least one auxiliary other than that in the pressed or briquetted core being present or
 4) the identical organic or inorganic pigment or the identical organic or inorganic pigments being present with auxiliaries identical to those in the pressed or briquetted core, at least one of the pigments in at least one outer layer applied by granulation then, however, not being pressed and not being briquetted.

In this way, it is possible to improve the pressed and briquetted granules and substantially to optimize the preparation process since, independently of the subsequent application medium, a uniform pressed or briquetted core fraction can always be used. This uniform core fraction can be filled into suitable containers and temporarily stored or transported to another location where the subsequent further processing takes place. In the further processing, at least one outer layer comprising at least one pigment powder is applied by granulation to the uniform core fraction in a further process step. The pigment powder comprising the core fraction and that comprising the outer layer applied by granulation need not necessarily be identical. This is advantageous particularly in the preparation of granules from pigment mixtures since it is possible to dispense with the prior mixing of the individual pigments. Thus, various orange shades can be prepared, for example, by mixing iron oxide red and iron oxide yellow pigments or various green shades can be prepared by mixing iron oxide yellow and phthalocyanine blue pigments. For the preparation of iron oxide orange granules, it is therefore possible either to apply an iron oxide red pigment as an outer layer to a compacted iron oxide yellow pigment (core fraction) by addition of said iron oxide red pigment by granulation or to apply an iron oxide yellow pigment as an outer layer to a compacted iron oxide red pigment (core fraction) by addition of said iron oxide yellow pigment by granulation. FIG. 1 illustrates this principle. It shows the optical micrograph of iron oxide orange granules in which an iron oxide red pigment was applied as an outer layer (designated as "B" in FIG. 1) to a compacted and subsequently rolled iron oxide yellow pigment (core fraction—designated as "A" in FIG. 1) by granulation. For the preparation of the optical micrograph, the granule particles were cast in a resin and ground.

What is important in the case of the multistage process according to the invention is that, in the first step, a sufficiently cohesive homogeneous material is produced by addition of the auxiliary or of the auxiliaries to one or more organic or inorganic pigment powders. As a rule, mixers are used for this purpose but in individual cases it may also be advantageous to use a mill. In the second step, pressing or briquetting once or several times is then effected. The core fraction is produced by a comminution step, such as, for example, screen granulation, and is optionally isolated by a separation step and can be rounded or coated. A separation step for isolating the core fraction is, however, not absolutely essential since the powder obtained in the comminution step can also be applied directly to the core fraction by granulation. The substantial process step in the process according to the invention is subsequent rolling with addition of one or more organic or inorganic pigments or pigment mixtures, the pigment or the pigments or pigment mixtures being mixed with one or more auxiliaries before or during the addition so that at least one outer layer is also applied by granulation. The application of the outer layer(s) by granulation can be effected in a fluidized bed or in a fluid bed. The auxiliary or auxiliaries used should permit as good processibility as possible in the respective application medium.

A further advantage of the process according to the invention is, inter alia, that it is possible to start from dried and possibly milled pigment powder. This is particularly economical especially when the pigment is prepared by a dry synthesis—such as, for example, the preparation of iron oxide red by calcination of iron oxide black or yellow. In spray granulation, for example, further preparation of a slurry and thereafter an additional drying step are required. Moreover, removal of the water used for preparing the slurry by evaporation is very energy-consuming.

DETAILED DESCRIPTION OF THE INVENTION

Inorganic pigments used are preferably iron oxide, titanium dioxide, chromium oxide, zinc oxide and rutile mixed-phase pigments and carbon black (carbon pigments). Organic pigments used are preferably azo, quinacridone, phthalocyanine and perylene pigments and indigoids. Inorganic pigments are preferably used. However, it is also possible to use fillers.

Both inorganic and organic substances may be used as auxiliaries.

Water, salts from the group consisting of the phosphates, phosphonates, carbonates, sulphates, sulphonates, silicates, aluminates, borates, titanates, formates, oxalates, citrates, tartrates, stearates, acetates, polysaccharides, cellulose derivatives, such as, preferably, cellulose ethers or cellulose esters, phosphonocarboxylic acids, modified silanes, silicone oils, oils from biological cultivation (preferably rapeseed oil, soya bean oil, maize oil, olive oil, coconut oil, sunflower oil), refined paraffinic and/or naphthenic mineral oils, synthetically prepared oils, alkylphenols, glycols, polyethers, polyglycols, polyglycol derivatives, ethylene oxide-propylene oxide copolymers, protein/fatty acid condensates, alkyl benzenesulphonates, alkyl naphthalenesulphonates, ligninsulphonates, sulphated polyglycol ethers, melamine/formaldehyde condensates, naphthalene/formaldehyde condensates, gluconic acid, polyacrylates, polycarboxylate ethers, polyhydroxy compounds, polyhydroxyamino compounds or solutions or mixtures or suspensions or emulsions thereof are preferably used as auxiliaries.

In the context of this invention, emulsifiers, wetting agents and dispersants are also considered to be auxiliaries.

Preferably emulsifiers having HLB values of 7 to 40, in particular of 7 to 18, are suitable as emulsifiers for use in building materials comprising aqueous systems, such as, for example, concrete, containing alkyl or acrylic radicals and hydrophilic intermediate and end groups, such as, for example, amides, amines, ether, hydroxyl, carboxylate, sulphate, sulphonate, phosphate, phosphonate, amine salt, polyether, polyamide or polyphosphate. The substances can be used individually or in combination, depending on their HLB value.

Preferably, alkyl benzenesulphonates, fatty alcohol sulphates, fatty alcohol ether sulphates, fatty alcohol ethoxylate, alkylphenol ethoxylate, branched and/or straight-chain alkane- or olefin-sulphonates, branched and/or straight-chain alkane- or olefin-sulphates and sulphosuccinates are suitable as wetting agents.

Preferably, ligninsulphonates, melaminesulphonates, naphthalenesulphonates, soaps, metal soaps, polyvinyl alcohols, polyvinyl sulphates, polyacrylamides, polyacrylates, polycarboxylate ethers, medium- and long-chain alkanesulphates or -sulphonates or -sulphosuccinates and medium- and long-chain alkanephosphates or -phosphonates are used as dispersants.

The auxiliaries can preferably be used in combination with further additives, such as, for example, antifoams, retention aids or fragrances.

Preservatives in a concentration of 0.01 to 1% by weight, based on the weight of the pigment granules, may also be added to the pigment granules, preferably during mixing. Formaldehyde-eliminating compounds, phenolic compounds or isothiazolinone preparations may be mentioned as examples.

The pigment granules preferably contain auxiliaries in a total amount of 0.001 to 10% by weight, particularly preferably of 0.01 to 5% by weight, very particularly preferably of 0.1 to 5% by weight, based on the total amount of the pigments.

The pressed or briquetted core according to a) and the outer layer applied by granulation or the outer layers applied by granulation according to b) and c) preferably contain in each case an inorganic or in each case an organic pigment.

The pressed or briquetted core according to a) and the outer layer applied by granulation or the outer layers applied by granulation according to b) and c) preferably contain the same pigment, but at least one of the outer layers applied by granulation contains an auxiliary which differs in amount or type from that in the pressed or briquetted core according to a).

The pressed or briquetted core according to a) and the outer layer applied by granulation or the outer layers applied by granulation according to b) and c) preferably contain the same pigment, the pigment in at least one of the outer layers applied by granulation not being pressed and not being briquetted.

The pressed or briquetted core according to a) and the outer layer applied by granulation or the outer layers applied by granulation according to b) and c) preferably contain in each case a plurality of inorganic pigments and/or in each case a plurality of organic pigments.

The pressed or briquetted core according to a) and the outer layer applied by granulation or the outer layers applied by granulation according to b) and c) preferably contain the same organic or inorganic pigments but at least one auxiliary which differs in amount or type from the core.

The pressed or briquetted core according to a) and the outer layer applied by granulation or the outer layers applied by granulation according to b) and c) preferably contain the same organic and/or inorganic pigments, the pigment in at least one of the outer layers applied by granulation not being pressed and not being briquetted.

The pigment or the pigments which forms or form the outer layer applied by granulation according to b) and c) is or are preferably altogether not more than four times the weight, preferably not more than the same weight, based on the weight of the pressed or briquetted core according to a).

The pressed or briquetted core according to a) preferably contains auxiliaries other than those in the outer layer applied by granulation according to b) and c).

The pressed or briquetted core according to a) is preferably coated once or several times with one or more auxiliaries.

The outer layer applied by granulation or the outer layers applied by granulation according to b) and c) are preferably in each case coated once or several times with one or more auxiliaries. Only the outermost of the outer layers applied by granulation according to b) and c) is preferably coated once or several times with one or more auxiliaries.

The inorganic pigment granules preferably have a bulk density in the range of 0.3 to 4.0 g/cm$^3$, preferably in the range of 0.5 to 2.0 g/cm$^3$, the pigment granules which contain carbon black or organic pigments preferably having a bulk density in the range of 0.1 to 2.5 g/cm$^3$. Preferably at least 85% of the pigment granules have a particle size in the range of 80 to 3000 μm, preferably in the range of 100 to 1500 μm.

The pigment granules preferably have a residual water content of less than 4% by weight, preferably less than 2% by weight. In the context of this invention, residual water is understood as meaning the residual moisture.

The pigment granules preferably additionally contain preservatives, antifoams, retention aids, antisettling agents and/or fragrances.

The invention also relates to a process for the preparation of pigment granules, characterized in that a) one or more organic or inorganic pigments are mixed with one or more auxiliaries,
b) this mixture is subjected to at least one pressing or briquetting step in order to obtain scabs,
c) these scabs are comminuted in at least one step to give nuclei and powder,
d1) the nuclei are separated from the powder in that the fraction greater than 80 μm, preferably greater than 100 μm, serves as a core fraction and optionally
  (i) is subjected to a rounding step and/or
  (ii) is coated with one or more auxiliaries,
  it being possible for step d1)(ii) also to take place before d1)(i) or it being possible for both steps to take place simultaneously, and the product obtained remaining in the production process while the other fraction is removed from the process or recycled, or
d2) the nuclei serve as a core fraction and the powder formed on comminution is applied completely to this core fraction by granulation by subsequent rolling, optionally one or more auxiliaries being added and it being possible for the product obtained and completely applied by granulation to be coated with one or more auxiliaries,
e) and at least one outer layer being applied by granulation by subsequent rolling to the product obtained with addition of one or more organic or inorganic pigments or mixtures thereof,
  (i) the organic or inorganic pigment or pigments or mixtures having been mixed beforehand with one or more auxiliaries and/or
  (ii) one or more auxiliaries being added during the subsequent rolling and/or
  (iii) the organic or inorganic pigment or pigments or the mixture of organic or inorganic pigments and at least one auxiliary having been subjected beforehand to one or more pressing or briquetting steps, in order to obtain subsequently rolled granules and
f) the granules subsequently rolled in this manner are optionally coated once or several times with auxiliaries.

During pressing or briquetting (compacting, step b)), an important characteristic is the pressing force (kN) per cm of roll width (nip force). During compacting between rolls, linear transmission of the pressing force is assumed since a pressing area cannot be defined and a pressure (kN/cm$^2$) therefore cannot be calculated.

The pressing or briquetting step b) is preferably effected by means of a roll press or matrix press and at nip forces of 0.1 to 50 kN/cm, preferably of 0.1 to 20 kN/cm.

If a plurality of pressing or briquetting steps is effected, identical or different nip forces can be used. The use of different nip forces is particularly advantageous, for example, when the organic and/or inorganic pigments have a very low bulk density so that precompaction is effected in a first pressing or briquetting step.

Preferably, a plurality of pressing or briquetting steps b) is effected directly in succession, identical or different pressing or briquetting units being used and the pressing or briquetting steps being carried out at identical or different nip forces in the range of 0.1 to 50 kN/cm, preferably of 0.1 to 20 kN/cm.

The compacting is preferably effected at low nip forces. The nip forces used are generally preferably in the bottom range of the commercially available apparatuses. Commercially available apparatuses are, for example, the Pharmapaktor 200/50 from Bepex GmbH, Leingarten, Germany.

The comminution in step c) can be effected by means of all commercially available comminution units, such as crushers, toothed rolls, rolls having friction apparatuses or screen granulators or screen-type mills, in which the material is pressed through a sieve (so-called coarse grinder). The rotors, as are generally known, revolve or oscillate at a circumferential velocity of 0.05 n/sec to 10 m/sec, preferably 0.3 to 5 m/sec. The distance between rotor and screen or perforated disc is 0.1 to 15 mm, preferably 0.1 to 5 mm, particularly preferably 1 to 2 mm.

The comminution in step c) is preferably effected by means of a sieve as a comminution unit having a mesh size of 0.5 to 4 mm, preferably of 1 to 2 mm.

Under certain circumstances, it is advantageous to carry out the comminution step c) several times in succession. For this purpose, a plurality of screen granulators or screen-type mills—preferably with different mesh sizes of the sieve—can be connected in series.

Preferably, a plurality of comminution steps c) by means of a sieve is effected directly in succession, different mesh sizes of the sieve being used and, in the last comminution step, a sieve having a mesh size of 0.5 to 4 mm, preferably of 1 to 2 mm, being used.

If a plurality of comminution steps c) is carried out directly in succession, different comminution units can also be combined with one another. Thus, for example, before the use of a screen granulator or a screen-type mill, a coarse comminution of the scabs by means of roll or jaw crushers can first be effected. Inter alia, the particle size distribution of the comminuted product can be influenced thereby. Preferably, a plurality of comminution steps c) is effected directly in succession, different comminution units being used.

Before the comminution in step c), the scabs from b) are preferably separated into two fractions, the coarse fraction in which at least 85% of the particles are greater than 500 μm, preferably greater than 600 μm, being fed to step c) and being comminuted in one or more steps and the fine fraction being fed to step d1) in order to be separated again into two or more fractions in step d1), separately from or together with the nuclei and the powder from step c), and to form the core fraction.

The nuclei and powder of the comminuted product from step c) are preferably separated into two fractions in step d1), the fine fraction smaller than 80 μm, preferably smaller than 100 μm, very particularly preferably smaller than 250 μm, being removed or recycled to the process and the coarse fraction greater than 80 μm, preferably greater than 100 μm, very particularly preferably greater than 250 μm, serving as a core fraction which is further converted in the process.

The nuclei and powder of the comminuted product from step c) are preferably separated into three fractions in step d1), the fine fraction and the coarse fraction being removed or recycled and the medium fraction in the range of 80 to 2000 μm, preferably in the range of 100 to 1500 μm, very particularly preferably in the range of 250 to 1000 μm, serving as a core fraction which is further converted in the process and optionally subjected to a rounding step and/or additionally coated. The rounding step d1)(i) is preferably effected on a rotating disc (pelletizing disc), in a coating drum or in a rotating drum (pelletizing drum), in a screen unit or in a fluidized bed or in a fluid bed. Here, the dust fraction can be removed by suction or discharged in the fluidized bed with the air. The dust fraction can be recycled to the process at another point.

After the comminution in step c), the removal of the fine fraction can also be omitted (step d2)). Instead, the nuclei formed in comminution step c) serve as a core fraction onto which the powder formed in the comminution step is completely applied by granulation by subsequent rolling. The subsequent rolling step under d2) is preferably effected on a rotating disc (pelletizing disc), in a coating drum or in a rotating drum (pelletizing drum). Optionally, coating with one or more auxiliaries can also be effected thereafter.

Before step e), the core fraction from step d1) is preferably separated into two fractions, the fine fraction or the coarse fraction being removed or recycled and the fraction in the range of 80 to 2000 μm, preferably in the range of 100 to 1500 μm, being fed to step e).

Before step e), the core fraction from step d1) is preferably separated into three fractions, the fine fraction and the coarse fraction being removed or recycled and the medium fraction in the range of 80 to 2000 μm, preferably in the range of 100 to 1500 μm, being fed to step e).

In the subsequent pelletizing step e), one or more organic or inorganic pigments or mixtures of organic and/or inorganic pigments, which were mixed beforehand with one or more auxiliaries, are added to the product obtained from the process steps described above and are applied by granulation by subsequent rolling. The subsequent rolling under e) is preferably effected on a rotating disc (pelletizing disc), in a coating drum or in a rotating drum (pelletizing drum). The auxiliary or auxiliaries used are chosen so that they permit good processability in the desired application medium. The auxiliary or auxiliaries used in process step e) therefore need not necessarily be identical to the auxiliary or auxiliaries which was or were added in process step a). The same applies to the organic or inorganic pigment(s). In process step e), it may be entirely advantageous to use a pigment or pigments or a pigment mixture which is or are different to that of those in process step a). If a plurality of pigments is used in process step e), it is unimportant whether they are added in succession or whether a mixture was prepared beforehand from the pigments and this mixture is added in step e). It is also unimportant whether a pigment mixture which contains one or more auxiliaries is prepared by first preparing the pigment mixture and then mixing this with one or more auxiliaries or by first mixing one or more pigments with one or more auxiliaries and finally mixing the pigments already mixed with auxiliary or auxiliaries.

Preferably, the organic and/or inorganic pigment(s) added in step e) is or are altogether not more than four times the weight, preferably not more than the same weight, based on the weight of the core fraction used in step e).

The organic and/or inorganic pigment(s) used in step e) is or are preferably different from the organic and/or inorganic pigment(s) which was or were used in process step a).

In step e), an organic or an inorganic pigment is preferably added.

In step e), preferably a plurality or organic and/or inorganic pigments are added in succession.

In step e), in particular a plurality of organic and/or inorganic pigments is added, these having been mixed with one another beforehand.

The organic and/or inorganic pigment(s) used in step e) is or are preferably mixed beforehand individually or as a mixture with one or more auxiliaries.

The granules obtained after step e) are separated, preferably before step f), into two fractions, and only the fraction in which the particles are greater than 80 μm, preferably greater than 250 μm, is fed to step f), while the fine fraction is removed from the process or recycled.

The granules obtained after step e) are separated, preferably before step f), into three fractions, and only the fraction in which at least 85% of the particles are greater than 80 μm, preferably greater than 100 μm, or are in the range of 80 to 3000 μm, preferably in the range of 100 to 1500 μm, is fed to step f), while the other fractions are removed from the process or recycled.

One or more drying steps are preferably additionally effected.

General Description of the Preparation Process

Mixing of the organic or inorganic pigment(s) with one or more auxiliaries, which is described in step a), can be effected in conventional mixers. The number of units and unit types is known to the person skilled in the art. In individual cases, it may be advantageous also to use a mill for the mixing process. The same applies to the preparation of the mixture of pigment(s) and auxiliary or auxiliaries which is used in process step e).

Before the comminution in step c), the scabs from b) can preferably be separated into two fractions (intermediate step x) in order subsequently for the coarse fraction in which at least 85% of the particles are greater than 500 μm, preferably 600 μm, to be fed to step c) and to be comminuted in one or more steps, and the fine fraction is fed to step d1) in order to be separated again in step d1), separately from or together with the nuclei and the powder from step c), into two or more fractions and to form the core fraction.

Preferably, only the coarse fraction from intermediate step x) is comminuted in step c) while the fine fraction from intermediate step x) is separated into two or more fractions in step d1).

The intermediate step x) can preferably be effected by classification or screening (mechanical separation). Screens, such as, for example, drum screens, oscillating screens and vibrating screens, are preferably used.

The nuclei and the powder of the comminuted product are preferably separated in d1) into two fractions, the fractions smaller than 80 µm, preferably smaller than 100 µm, very particularly preferably smaller than 250 µm, being removed or recycled to the process and the fraction greater than 80 µm, preferably greater than 100 µm, very particularly preferably greater than 250 µm, serving as core fraction. The amount of the fine fraction is preferably 10 to 50% by weight, particularly preferably 10 to 30% by weight. The fine fraction is removed from the process and can be recycled to the process at another point. The fraction remaining in the process serves as a core fraction and is optionally rounded in a further step d1)(i) and/or coated with one or more auxiliaries in step d1)(ii).

The nuclei and the powder of the comminuted product are particularly preferably separated in step d1) into three fractions, the fine fraction and the coarse fraction being removed from the process or recycled to the process and the medium fraction in the range of 80 to 2000 µm, particularly preferably in the range of 100 to 1500 µm, very particularly preferably in the range of 250 to 1000 µm serving as core fraction. The amount of the fine and coarse fraction is preferably 10 to 50% by weight, particularly preferably 10 to 30% by weight. The fine and coarse fraction is removed from the process and can be recycled to the process at another point. The fraction remaining in the process serves as a core fraction and is optionally rounded in a further step d1)(i) and/or coated with one or more auxiliaries in step d1)(ii).

The rounding step under d1) can be carried out with removal of the dust fraction. The rounding step d1)(i) can be effected on a rotating disc (pelletizing disc), in a coating drum or in a rotating drum (pelletizing drum), in a screen unit or in a fluidized bed or in a fluid bed. Here, the dust fraction can be removed by suction or discharged in the fluidized bed with the air. The dust fraction can be recycled to the process at another point.

Particularly preferably, the nuclei of the comminuted product from step c) serve, without separation into a plurality of fractions in step d2), as the core fraction and the powder of the comminuted product from step c) is completely applied to the core fraction by granulation by subsequent rolling, one or more auxiliaries optionally being added and it being possible for the completely granulated product obtained to be coated with one or more auxiliaries.

The subsequent rolling and complete granulation of the comminuted product in step d2) are preferably carried out on a rotating disc (pelletizing disc) or in a coating drum or in a rotating drum (pelletizing drum).

Before process step e), it may be advantageous to carry out a further intermediate step y) in which a desired particle size fraction is separated from the product stream. Preferably, only the fraction in the range of 80 to 2000 µm, very particularly preferably in the range of 100 to 1500 µm, is fed to process step e) while the fine and/or coarse fraction are removed from the process or recycled to the process. The intermediate step y) may be advantageous when the comminuted product from step c) was fed to step d2).

Before step e), the core fraction from step d1) is preferably separated into two fractions, the fine fraction or the coarse fraction being removed or recycled and the fraction in the range of 80 to 2000 µm, in particular in the range of 100 to 1500 µm, being fed to step e).

Before step e), the core fraction from d1) is preferably separated into three fractions, the fine fraction and the coarse fraction being removed or recycled and the medium fraction in the range of 80 to 2000 µm, in particular in the range of 100 to 1500 µm, being fed to step e).

The intermediate step y) can preferably be effected by classification or screening (mechanical separation). Screens, such as, for example, drum screens, oscillating screens and/or vibrating screens, are preferably used.

The subsequent rolling in step e) is preferably effected on a rotating disc (pelletizing disc) or in a coating drum or in a rotating drum (pelletizing drum).

The organic or inorganic pigment(s) used in process step e) needs or need not be identical to the organic or inorganic pigment(s) described under step a). In the preparation of mixed colours, the choice of different pigments is even particularly advantageous.

The granules obtained after step e) can preferably also be coated in step f) once or several times with one or more auxiliaries.

The coating of the pigment granules serves for increasing the stability or as an aid in processing. This layer can be produced by application of inorganic salts in solution, of polyols or waxes of polyethers, polycarboxylates, polycarboxylate ethers or cellulose derivatives, preferably carboxymethylcellulose.

After process step e), it may be advantageous to carry out a further intermediate step z) in which a desired particle size fraction is separated from the granules obtained. Preferably, the fraction greater than 80 µm, preferably greater than 100 µm, or the fraction in the range of 80 to 3000 µm, preferably in the range of 100 to 2500 µm, or particularly preferably in the range of 250 to 1500 µm, is separated off and is fed to step f). Oversize and/or undersize can be removed from the process or recycled. Optionally, it may be advantageous to carry out the intermediate step z) also after step f).

The granules obtained after step e) are preferably separated before step f) into two fractions and only the fraction in which the particles are greater than 80 µm, particularly greater than 250 µm, is fed to step f) while the fine fraction is removed from the process or recycled.

The granules obtained after step e) are preferably separated before step f) into three fractions and only the fraction in which at least 85% of the particles are greater than 80 µm, and particularly greater than 100 µm, or are in the range of 80 to 3000 µm, in particular in the range of 100 to 1500 µm, is fed to step f) while the other fractions are removed from the process or recycled.

The intermediate step z) can preferably be effected by classification or screening (mechanical separation). Screens, such as, for example, drum screens, oscillating screens and/or vibrating screens, are preferably used.

The recycling of oversize and/or of undersize separated off to the process can be effected at various points. It is dependent, inter alia, on which auxiliaries were added, whether one or more pigments are used for the total process and whether mixing of the auxiliaries or pigments via the recycling of oversize and undersize is desired or not. However, the person skilled in the art will without doubt recognize that process step in the process according to the invention which is ideal for this application and in which recycling of the oversize and/or undersize separated off is particularly advantageous.

When recycling the oversize, it may be advantageous if it is comminuted after being separated off and before being recycled.

The process according to the invention can be applied not only to inorganic and/or organic pigments but also to fillers.

The invention also relates to the use of the pigment granules for colouring building materials, such as concrete, cement mortar, renders and asphalt, and for colouring organic media, such as finishes, plastics and colour pastes, and for the preparation of emulsion paints and slurries.

The pigment granules are preferably mixed with the building materials in an amount of 0.1 to 10% by weight, based on cement, or, in the case of asphalt, based on the total mixed material.

The pigment granules are preferably first suspended in water and then mixed with the building materials.

The pigment granules are preferably mixed with the organic media.

The organic media are preferably plastics.

The plastics are preferably thermoplastics, thermosetting plastics and/or elastomers.

The pigment granules are preferably mixed with liquid plastics.

The organic media are preferably polymers having rubber-elastic properties.

The organic media are preferably powder coating materials.

The pigment granules are preferably mixed with the emulsion paints.

The subject of the present invention arises not only out of the subject of the individual patent claims but also out of the combination of the individual patent claims with one another. The same applies to all parameters disclosed in the description and any desired combinations thereof. The invention is explained in more detail with reference to the following examples, without there being any intention to limit the invention thereby.

EXAMPLES

I. Description of the Methods of Measurement Used

A. Determination of the Dispersibility for Building Materials

The determination of the dispersibility for building materials is effected in cement mortar by colorimetric measurement of prisms produced using white cement and having the following data: Cement-quartz sand ratio 1:4, water-cement value 0.35, level of pigmentation 1.2%, based on cement, mixer used from RK Toni Technik, Berlin, with 5 l mixing bowl, design 1551, speed 140 rpm, batch 500 g of cement.

After a mixing time of 40 s, 55 s, 70 s, 85 s and 100 s, samples of (300 g) of the mixture are taken in each case and test specimens (5×10×2.5 cm) are produced therefrom under pressure (pressing force 114 kN for 2 seconds). Hardness of the test specimens: 24 hours at 30° C. and 95% relative humidity with subsequent drying for 4 hours at 60° C. Colorimeter measurement via Dataflash® 2000 Datacolor International, 4 measuring points per stone. The mean values obtained are compared with the values of a reference sample. The colour difference $\Delta E_{ab}*$ and the colour strength (reference sample=100%) (DIN 5033, DIN 6174) are assessed. In the context of this application, the following colorimetric abbreviations and calculations are used, as known from the CIELAB system:

a* corresponds to the red-green axis with $\Delta a*=a*$(sample)−a*(reference)

b* corresponds to the yellow-blue axis with $\Delta b*=b*$(sample)−b*(reference)

L* corresponds to the lightness with $\Delta L*=L*$(sample)−L*(reference).

$\Delta E_{ab}*$ corresponds to the colour difference, where $(\Delta E_{ab}*)^2=(\Delta L)^2+(\Delta a*)^2+(\Delta b*)^2$, i.e. $\Delta E_{ab}*=[(\Delta L)^2+(\Delta a*)^2+(\Delta b*)^2]^{1/2}$, For the relative colour strength in %, the following equations apply:

$$\text{Relative colour strength in \%} = \frac{(K/S)_{sample}}{(K/S)_{reference}} \cdot 100$$

$$K/S = \frac{(1-\beta*)^2}{2 \cdot \beta*}$$

$$\beta* = \frac{Y/100 - r_0}{1 - r_0 - r_2 \cdot (1 - Y/100)},$$

where $r_0=0.04$ and $r_2=0.6$ and Y is the tristimulus value (lightness).

The calculation is effected on the basis of DIN 53234.

The dispersibility is designated as good at a colour difference up to 5% relative to the reference sample and a colour difference $\Delta E_{ab}*$ of not more than 1.5 units.

B. Determination of the Dispersibility for Asphalt

The determination of the dispersibility in asphalt was effected according to the following method: the pigment powder or pigment granules is or are mixed in a heatable laboratory mixer (Rego mixer) together with a road construction bitumen of the type B 80 (commercial product from Shell AG) and additives for 60 seconds at 180° C. Test specimens are produced with the mixture according to Marshall ("The Shell Bitumen Handbook, Shell-Bitumen U.K., 1990, pages 230-232). Differences in the shade of the Marshall bodies compared with a predetermined comparative sample of pigment powder are assessed calorimetrically by comparison of the red values a* (Minolta Chromameter II, standard illuminant C, CIELAB System, DIN 5033, DIN 6174). Differences in the a* values of less than 0.5 unit are not visibly distinguishable.

C. Determination of the Dispersibility for Plastics

The determination of the dispersibility in plastics is effected on the basis of DIN EN 13900-2: Pigment and fillers—dispersing methods and assessment of the dispersibility in plastics, part 2, Determination of the colouristic properties and ease of dispersion in plasticizer-containing polyvinyl chloride (PVC-P) moulding material by two-roll milling. The pigment or pigment granules to be tested is or are dispersed at 160±5° C. in the form of a lightened mixture comprising pigments and a titanium dioxide white pigment powder (Tronox® R-FK-2; Tronox® R-FK-2 is a commercial product of Tronox Incorporated) in the weight ratio=1:5 on a mixing roll mill in PVC. The mill hide obtained is divided and one half is then subjected to high shear forces by rolling at room temperature. The ease of dispersion $DH_{PVC-P}$, which indicates the percentage increase in the colour strength after rolling at room temperature, is a measure of the dispersibility in the case of coloured pigments. The colour strength of the cold-rolled PVC hide is fixed at 100% as a reference and is determined according to the abovementioned formulae. The ease of dispersion $DH_{PVC-P}$ is then calculated according to $$DH_{PVC-P} = 100 * \left( \frac{F_{cold\text{-}rolled\ sample}}{F_{hot\text{-}rolled\ sample}} - 1 \right).$$

Here, $F_{hot\text{-}rolled\ sample}$ is the colour strength value of the hot-rolled test specimen and $F_{cold\text{-}rolled\ sample}$ is accordingly the colour strength value of the cold-rolled test specimen. The abovementioned formulae are applicable for the calculation of the colour strength, $r_0$ being 0.05325 and $r_2$ being 0.65 in the case of testing in plastics.

In the determination of the dispersibility in plastics, the colour difference $\Delta E_{ab}^*$ between hot- and cold-rolled PVC hide is additionally determined. For the calculation of $\Delta L^*$, $\Delta a^*$, $\Delta b^*$ the formulae mentioned above and known from the CIELAB system are applicable. Here, cold-rolled PVC hide also serves as reference. A readily dispersible pigment or pigment granules is or are already completed dispersed at low shear forces, whereas higher shear forces are necessary to aid rolling at low temperature for completely dispersing a pigment which is difficult to disperse. The following is therefore applicable: the greater the ease of dispersion and the smaller the colour difference $\Delta E_{ab}^*$, the more readily is the pigment dispersible. Particularly in the case of granules the dispersibility is very important since the granule particles first have to be broken up and are then dispersible in a plastic. This dispersibility of coloured pigments or granulated coloured pigments is designated as good at an ease of dispersion of not more than 10% and at a colour difference $\Delta E_{ab}^*$ of not more 1.5 units in the test method described above.

D. Determination of the Dispersibility of Emulsion Paints

The dispersibility of coloured pigments in emulsion paints is determined by means of dissolvers. The test medium is an emulsion paint based on a PVA dispersion (vinyl acetate/vinyl versatate) having a pigment volume concentration of 55% (pigment/filler ratio 40/60). Following incorporation of the pigment, 180 g of white emulsion paint are initially introduced and then 6.0 g of the coloured pigment to be tested are sprinkled in with stirring (Tronox® R-KB-2/coloured pigment weight ratio=5:1; Tronox® R-KB-2 is a commercial product of Tronox Incorporated). The following dispersing conditions are established using a dissolver disc (diameter 4 cm):

| | |
|---|---|
| 10 min | 1000 rpm (2.1 m/s) |
| 20 min | 2000 rpm (4.2 m/s) |
| 10 min | 4500 rpm (9.4 m/s) |

After the individual dispersing times, coats having a wet film thickness of 150 µm (gap height of the coating knife) are prepared and are dried at room temperature. After the drying, the coats (coating films) are peeled off using a sharp-edged object, with the result that the undispersed pigment particles appear as dots or stripes (specks) at the surface. The dispersing energy to be applied to the granules is assessed using a rating scale from level 1 to 5:

Level 1: no specks
Level 2: a few specks
Level 3: moderate number of specks
Level 4: many specks
Level 5: very many specks Good dispersibility is present only at the rating levels 1 and 2; from level 3, the rating for the dispersing energy applied is insufficient.

E. Determination of the Self-Plasticization of Slurries

In the preparation of slurries, 300 g of water are initially introduced and the pigment powder or pigment granules to be tested is or are introduced at room temperature without further additions of additives ("self-plasticization") with stirring by means of a dissolver disc having a diameter of 3.5 cm at about 1500 rpm until a suspension having a solids content of 70% by weight is achieved. If a viscosity value of more than 1000 mPa·s is obtained for this starting slurry with a Brookfield viscosimeter with the use of the Brookfield measuring spindle no. 4 and at a speed of 100 rpm, the solids content is reduced in steps of 5% by weight by adding water until a viscosity value of less than 1000 mPa·s is established. If, on the contrary, the starting slurry having a solids content of 70% by weight has a very low viscosity, its solids content is increased in steps of 5% by weight by adding pigment powder or pigment granules until the maximum solids content which still permits a viscosity value of less than 1000 mPa·s is achieved. During use in practice, the slurries having a viscosity up to 1000 mPa·s are considered to be capable of being handled (pumpable and meterable) without problems. 24 hours after preparation of the slurry, the viscosity is measured again with the Brookfield viscosimeter with the use of spindle no. 4 and at a speed of 100 rpm. An increase in the viscosity to above 1000 mPa·s is undesired. In the preparation of slurries from pigment particles or pigment granules, as high a solids content as possible in combination with as low a viscosity as possible is desirable. Pigment granules are therefore all the more suitable for the preparation of slurries ("self-plasticization") if the slurry prepared has as low a viscosity as possible at as high a solids content as possible.

F. Determination of the Flow Behaviour

The flow behaviour of the pigment granules is determined by measuring the efflux time through a funnel of 100 ml volume having a 6 mm orifice, on the basis of ASTM test to D 1200-88.

The present invention is explained in more detail below with reference to examples without these examples constituting a limitation. The granules from Examples 1, 3 and 5 were prepared by processes which correspond to the prior art and serve as a comparison.

II. Comparative Example 1

50 kg of iron oxide red Bayferrox® 160 (commercial product from Lanxess Deutschland GmbH) were mixed with 1.5% of polypropylene glycol (average molecular weight about 2000) in a mixer for 15 minutes. The mixture was pressed on a 200/50 compactor (from Bepex, Leingarten) at around 15 kN (3 kN/cm) and then comminuted on a crusher (from Frewitt, Fribourg, Switzerland) having a screen of 1.25 mm mesh size. The comminuted product was screened over a screen having a mesh size of 250 µm. The oversize fraction was about 77%. For testing in the various media, in each case the fraction from 315 µm to 1250 µm was used (Comparative Example 1).

The results of the investigation of the granules from Comparative Example 1 are summarized in Table 1.

III. Example 2

The Bayferrox® 160 described above was mixed with the following auxiliaries for 15 minutes in a mixer:
I. 1.5% of polypropylene glycol (average molecular weight about 2000)
II. 3.0% Texapon® 842 (Texapon® 842 is an aqueous solution of sodium octylsulphate containing around 30% of active substance, commercial product from Cognis Deutschland GmbH & Co. KG)
III. 3.0% of a 30% strength aqueous polyethylene glycol solution (average molecular weight about 20 000)
IV. 2.0% of a 45% strength aqueous solution of ammonium ligninsulphonate In each case 1.0 kg of the fraction from Example 1 screened over 250 µm was introduced into a granulating pan having a diameter of 70 cm and an inclination of 53° and was rolled for about 3 minutes at 34 rpm. In each case 0.5 kg of the
a) abovementioned mixture I.
b) abovementioned mixture II.
c) abovementioned mixture III.
d) abovementioned mixture IV.
was introduced in the course of about 3 minutes uniformly into the rotating granulating pan, and the total sample was then further rolled for another 4 minutes (Examples 2a to 2d).

For testing in the various media, in each case the fraction from 315 µm to 1250 µm was used in order always to compare the same particle sizes with one another.

The results of the investigation of the granules from Examples 2a to 2d are summarized in Table 1. Table 1 shows that Comparative Example 1 and Example 2a behave very similarly in all performance characteristics tested. Thus, no significant improvement in the formed characteristics is detectable as a result of the straightforward application by granulation of an outer layer which contains an additive identical to that in the compacted core.

The granules from Examples 2b to 2d on the other hand show substantial advantages over Comparative Example 1 and Example 2a) in at least one performance characteristic. Thus, the sample from Example 2b is substantially better dispersible in building materials: a final colour strength of 99%, based on the powder used, is reached after only 55 s. The granules from Comparative Example 1 give a colour strength of 96% only after a mixing time of 85 s, and the granules from Example 2a) show a mere colour strength of 94% after a mixing time of 85 s. On incorporation into emulsion paint or in the preparation of slurries, the sample from Example 2b shows no substantial differences from Comparative Example 1 and Example 2a. The dispersibility in asphalt meets the requirements.

In the case of self-plasticization, the granules from Example 2c permit a 5% higher solids content than Comparative Example 1 and Example 2a.

With regard to their dispersibility in building materials, the granules from Example 2d are comparable with those from Example 2b. and are thus rated better than Comparative Example 1. However, on incorporation into a slurry, the granules from Example 2d additionally permit a very high solids content of 75% in combination with a very low viscosity.

IV. Comparative Example 3

50 kg of iron oxide red Bayferrox® 110 (commercial product from Lanxess Deutschland GmbH) were mixed with 1.0% of Walocel® CRT 30 P (commercial product from Wolff Cellulosics GmbH & Co. KG) in a mixer for 15 minutes and then homogenized by means of a Bauermeister mill having a 1 mm screen insert. The homogenized product was pressed on a 200/50 compacter at about 5 kN (1 kN/cm) and then comminuted on a crusher having a screen of 1.25 mm mesh size. The comminuted product was screened over a screen having a mesh size of 250 µm. The oversize fraction was about 87%. For testing in the various media, in each case the fraction from 315 µm to 1250 µm was used (Comparative Example 3a).

A part of the comminuted product from Comparative Example 3a was introduced, without prior screening, into a granulating pan having a diameter of 70 cm and an inclination of 53° and was rolled discontinuously for about 10 minutes at about 35 rpm. The rolled material was screened over a screen having a mesh size of 250 µm. The oversize fraction was about 94%. For testing in the various media, once again the fraction from 315 µm to 1250 µm was used in order always to compare the same particle sizes with one another (Comparative Example 3b).

The results of the investigation of the granules from Comparative Examples 3a and 3b are summarized in Table 1.

V. Example 4

The Bayferrox® 110 powder used in Example 3 was mixed in a mixer with the following additives in the course of 15 minutes:
I. 5.0% of a 20% strength aqueous solution of a partly hydrolysed polyvinyl alcohol having a low molecular weight
II. 3.0% of an about 35% strength aqueous solution of a polycarboxylate ether
III. 3.0% of an about 30% strength aqueous solution of a polyacrylate.

In each case 1.0 kg of the screened material (fraction>250 µm) from Comparative Example 3a was then introduced into a granulating pan having a diameter of 70 cm and an inclination of 53° and was rolled for about 3 minutes at about 34 rpm. In each case 0.5 kg of the
a) abovementioned mixture I.
b) abovementioned mixture II.
c) abovementioned mixture III.

was introduced uniformly in the course of about 3 minutes into the rotating granulating pan and then the total sample was further rolled for another 4 minutes (Examples 4a to 4c).

For testing in the various media, in each case the fraction from 315 µm to 1250 µm was used in order always to compare the same particle sizes with one another.

The results of the investigation of the granules from Examples 4a to 4c are summarized in Table 1. Table 1 shows that Comparative Examples 3a and 3b are disadvantageous in all performance characteristics tested, with the exception of the dispersibility in plastics. The dispersibility in building materials is insufficient since, even after a mixing time of 100 s, only final colours strength of 91% and 88%, respectively, result, therefore the granules are not yet completely dispersed. Thus, no significant improvements in the performance characteristics are found as a result of the straightforward application by granulation of an outer layer which consists of compacted fine fraction and contains an additive identical to that in the compacted core. The granules from Comparative Example 3a also show unsatisfactory behaviour in the self-plasticization. A slurry prepared with a solids content of 60% has a relatively low viscosity but thickens to a very great extent in the course of a day and finally, with a viscosity>1700 mPa·s, can no longer be handled.

The granules from Examples 4a to 4c on the other hand show substantial advantages over the comparative examples in at least one performance characteristic. Thus, the granules from Example 4a are substantially better dispersible in building materials: a final colour strength of 97%, based on the powder used, is achieved even after a mixing time of 70 s. However, the granules from Example 4a are not suitable for the preparation of a slurry.

On the other hand, the granules from Examples 4b and 4c show different behaviour. On incorporation into building materials, they achieve a colour strength of only 90% and 91%, respectively, after a mixing time of 100 s and are therefore identical to the two comparative examples, the granules from Examples 4b and 4c are very suitable for self-plasticization. With the granules from Example 4b, it is possible to prepare a suspension having a solids content of 60%, which can also be used without problems after storage for one day, and granules from Example 4c even permit a solids content of 65%.

VI. Comparative Example 5

For the preparation of an iron oxide orange mixture, Bayferrox® 920 and Bayferrox® 110 are mixed in a weight ratio of 3:2 in a mixer. 1.5% of a 45% strength aqueous solution of polyethylene glycol (average molecular weight about 4000) are added to this mixture in a mixer and mixed for a further 15 minutes. The mixture was pressed on a 200/50 compacter at about 16 kN (3 kN/cm) and then comminuted on a crusher having a screen of 1.5 mm mesh size. The comminuted product was introduced in 1.0 kg portions into a granulating pan having a diameter of 70 cm and an inclination of 53° and rolled at about 35 rpm until the fine fraction had been completely applied by granulation. For testing the various media, once again the fraction from 315 µm to 1250 µm was used in order always to compare the same particle sizes with one another (Comparative Example 5).

The orange starting mixture described above, before addition of the polyethylene glycol solution, served in the investigation of the dispersibility in building materials as a reference for the colour strength. The results of the investigation of the granules from Comparative Example 5 are summarized in Table 2.

VII. Example 6

1.5% of a 45% strength aqueous solution of polyethylene glycol (average molecular weight about 4000) were added to 20 kg of iron oxide yellow Bayferrox® 920 from Example 5 in a mixer and mixed for 15 minutes. The mixture was pressed on a 200/50 compacter (from Bepex, Leingarten) at about 16 kN (3 kN/cm) and then comminuted on a crusher (from Frewitt, Fribourg, Switzerland) having a screen of 1.5 mm mesh size. The comminuted product was screened over a screen having a mesh size 250 µm.

The Bayferrox® 110 powder used for Example 5 was mixed in a mixer with the following auxiliaries for 15 minutes:
  I. 4.0% of a 25% strength solution of sodium caprylate (solvent water:ethanol 1:1)
  II. 3.0% of an about 30% strength aqueous solution of a polyacrylate
  III. 3.0% of an about 30% strength aqueous polyethylene glycol solution (average molecular weight about 20 000)

In each case 0.6 kg of the abovementioned compacted, comminuted and screened Bayferrox® 920 granules was introduced into a granulating pan having a diameter of 70 cm and an inclination of 53° and rolled at about 34 rpm. Thereafter, in each case 0.4 kg of the
  a) abovementioned mixture I.
  b) abovementioned mixture II.
  c) abovementioned mixture III.

was introduced uniformly in the course of about 3 minutes into the rotating granulating pan by forcing the powder through a screen of 0.5 mm mesh size (Examples 6a to 6c).

For testing in the various-media, in each case the fraction from 315 µm to 1250 µm was used. The results of the investigation of the granules from Examples 6a to 6c are summarized in Table 2. The granules from Comparative Example 5 cannot be satisfactorily dispersed in building materials. Even after a mixing time of 100 s, a colour strength of only 80%, based on the orange starting mixture used, is obtained. The granules from Examples 6a to 6c on the other hand show substantially improved dispersibility.

VIII. Example 7

The following powder mixtures were prepared in a mixer:
  I. the Bayferrox® 920 powder used in Example 6 for the preparation of the pressed core, with 3.0% of an about 35% strength aqueous solution of a polycarboxylate ether
  II. a 9:1 mixture of the Bayferrox® 920 powder used in Example 6 for the preparation of the pressed core and a phthalocyanine blue pigment (Bayplast® Blue, commercial product from Lanxess Deutschland GmbH) with 3.0% of a 45% strength aqueous polyethylene glycol solution (average molecular weight about 4000).

The amount stated in each case below for the compacted, comminuted and screened Bayferrox® 920 granules described in Example 6 was introduced into a granulating pan having a diameter of 70 cm and an inclination of 53° and rolled at about 34 rpm. Thereafter, in each case the amount stated below of the abovementioned mixture I. or II. was introduced uniformly in the course of about 3 minutes into the rotating granulating pan by forcing the powder or the powder mixtures through a screen of 0.5 mm mesh size.
  a) 0.6 kg of the compacted, comminuted and screened Bayferrox® 920 granules and 0.4 kg of the mixture I.
  b) 0.8 kg of the compacted, comminuted and screened Bayferrox® 920 granules and 0.2 kg of the mixture II.
  c) 0.6 kg of the compacted, comminuted and screened Bayferrox® 920 granules and 0.4 kg of the mixture II.

For testing the various media, in each case the fraction from 315 µm to 1250 µm was used. The results of the investigation of the granules from Examples 7a to 7c are summarized in Table 3.

TABLE 1

| | | | Dispersibility in building material | | | | Dispersibility in plastic | | | | |
| | | | Colour | | | | | | | Self-plasticization | |
| | Residual moisture [%] | Efflux time [s] | strength [%]/ mixing time [s]; Reference: Starting powder | Colour difference ΔE$_{ab}$*; Reference: Starting powder | Dispersibility in asphalt Δa* value; Reference: Starting powder | Dispersibility in emulsion paint 150 μm wet film thickness | Ease of dispersion HD$_{PVC-P}$ [%] | Colour difference ΔE$_{ab}$*; Reference: cold-rolled PVC hide | Solids content [%] | Viscosity of the preparation [mPa · s] | Viscosity after one day [mPa · s] |
|---|---|---|---|---|---|---|---|---|---|---|---|
| Comparative Example 1 | 0.9 | 37 | 96/85 | 0.6 | 0.0 | 5/4/1-2 | n.d. | n.d. | 55 | 840 | 820 |
| Example 2a | 0.7 | 32 | 94/85 | 0.7 | −0.4 | 5/3-4/1 | n.d. | n.d. | 55 | 460 | 420 |
| Example 2b | 0.4 | 31 | 99/55 | 0.9 | 0.0 | 5/3-4/1 | n.d. | n.d. | 55 | 640 | 600 |
| Example 2c | 0.6 | 29 | 97/55 | 0.7 | −0.1 | 5/4/1 | n.d. | n.d. | 60 | 960 | 840 |
| Example 2d | 0.4 | 29 | 97/55 | 0.6 | 0.0 | 5/4/1 | n.d. | n.d. | 70 | 300 | 300 |
| Comparative Example 3a | 0.2 | 35 | 91/100 | 1.2 | n.d. | n.d. | 5 | 0.9 | 60 | 380 | 1720 |
| Comparative Example 3b | n.d. | n.d. | 88/100 | 2.1 | n.d. | n.d. | n.d. | n.d. | n.d. | n.d. | n.d. |
| Example 4a | 1.3 | 28 | 97/70 | 1.2 | n.d. | n.d. | 7 | 1.1 | 60 | 940 | >2000 |
| Example 4b | 0.3 | 27 | 90/100 | 1.2 | n.d. | n.d. | 4 | 0.7 | 60 | 340 | 880 |
| Example 4c | 0.4 | 29 | 91/100 | 1.1 | n.d. | n.d. | 7 | 1.0 | 65 | 800 | 620 |

TABLE 2

| | | | Dispersibility in building material | |
|---|---|---|---|---|
| | Residual moisture [%] | Efflux time [s] | Colour strength [%]/ mixing time [s]; Reference: Starting mixture | Colour difference ΔE$_{ab}$*; Reference: starting power |
| Comparative Example 5 | n.d. | 44 | 80/100 | 3.2 |
| Example 6a | 0.1 | 44 | 96/85 | 1.0 |
| Example 6b | 0.1 | 36 | 97/70 | 0.9 |
| Example 6c | 0.1 | 39 | 99/85 | 1.0 |

TABLE 3

| | | | Dispersibility in plastic | | Self-plasticization | |
|---|---|---|---|---|---|---|
| | Residual moisture [%] | Efflux time [s] | Ease of dispersion HD$_{PVC-P}$ [%] | ΔE$_{ab}$*; Reference: cold-rolled PVC hide | Solids content [%] | Viscosity after preparation [mPa · s] | Viscosity after one day [mPa · s] |
| Example 7a | 1.3 | 42 | n.d. | n.d. | 30 | 870 | 840 |
| Example 7b | 0.9 | 42 | 2 | 0.5 | n.d. | n.d. | n.d. |
| Example 7c | 0.9 | 36 | 3 | 0.7 | n.d. | n.d. | n.d. |

"n.d." in Tables 1 to 3 denotes "not determined".

Figure 1:
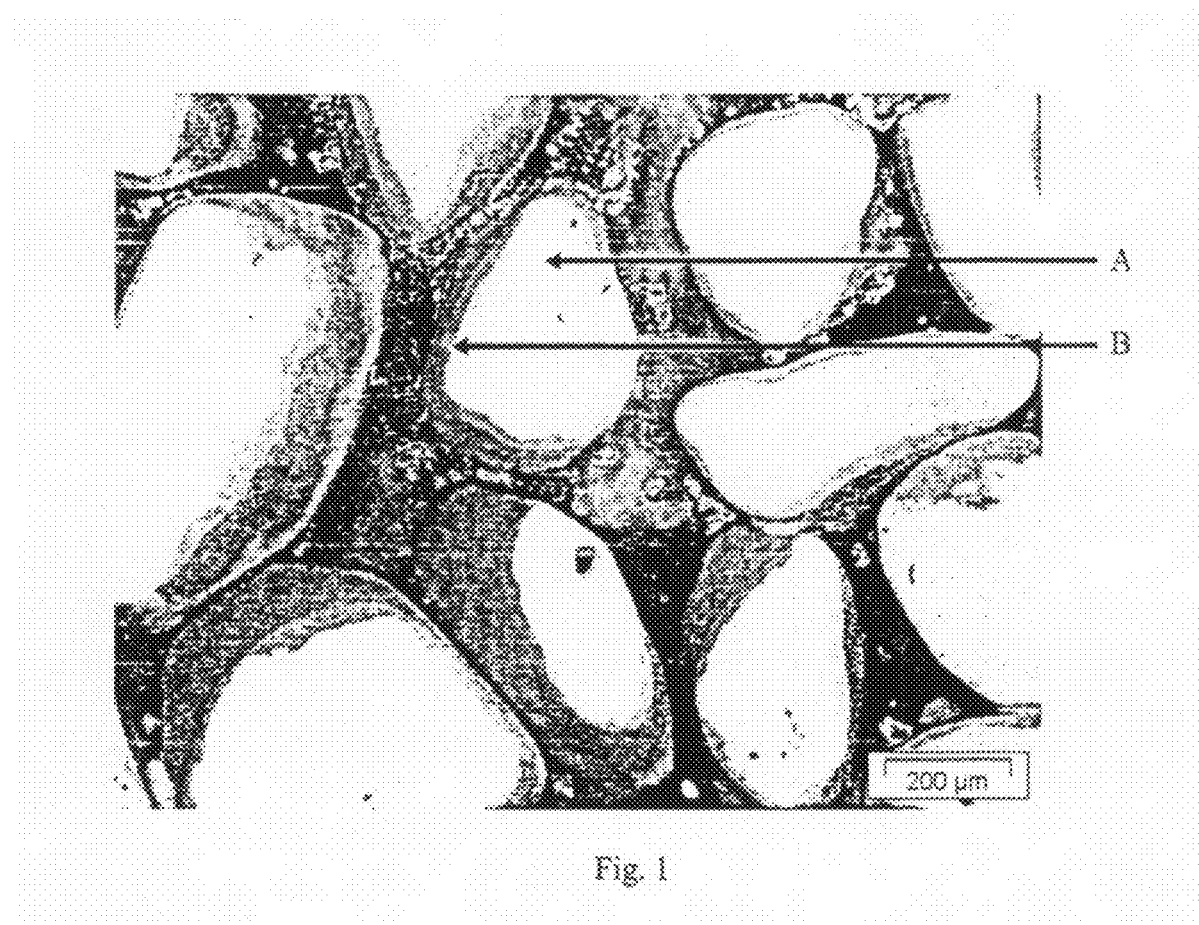
FIG. 1 schematically illustrates an optical micrograph of iron oxide orange granules in which a compacted iron oxide yellow pigment serves as the core fraction (designated "A" in FIG. 1) on which an iron oxide red pigment (designated as "B" in FIG. 1) was applied as an outer layer by granulation. The granule particles are embedded in a resin and ground.

What is claimed is:

1. Pigment granules comprising:
   a pressed or briquetted core having a size in the range of 80 μm to 2000 μm and at least one outer layer applied by granulation, wherein
   a) the pressed or briquetted core comprises at least one organic and/or inorganic pigment and at least one auxiliary;
   b) the at least one outer layer comprises at least one further non-fluorescing organic and/or inorganic pigment and at least one further auxiliary; and
   c) in the at least one outer layer:
      1) the at least one further non-fluorescing organic and/or inorganic pigment is different than the organic and/or inorganic pigment comprised by the pressed or briquetted core;
      2) the at least one further auxiliary is different than the auxiliary comprised by the pressed or briquetted core;
      3) the at least one further non-fluorescing organic and/or inorganic pigment is different than the organic and/or inorganic pigment comprised by the pressed or briquetted core and the at least one further auxiliary is different than the auxiliary comprised by the pressed or briquetted core; or
      4) the at least one further non-fluorescing organic and/or inorganic pigment has at least one further auxiliary being identical to those in the pressed or briquetted core, whereby at least one of the further non-fluorescing organic and/or inorganic pigment(s) in at least one outer layer is not pressed or briquetted.

2. The pigment granules according to claim 1, wherein all the inorganic pigments are selected from iron oxide, titanium dioxide, chromium oxide, zinc oxide, rutile mixed-phase pigments and carbon black (carbon pigments).

3. The pigment granules according to claim 1, wherein all the organic pigments are selected from azo, quinacridone, phthalocyanine and perylene pigments and indigoids.

4. The pigment granules according to claim 1, wherein all the auxiliaries comprise: water, salts from the group consisting of the phosphates, phosphonates, carbonates, sulphates, sulphonates, silicates, aluminates, borates, titanates, formates, oxalates, citrates, tartrates, stearates, acetates, polysaccharides, cellulose derivatives, phosphonocarboxylic acids, modified silanes, silicone oils, oils from biological cultivation, refined paraffinic and/or naphthenic mineral oils, synthetically prepared oils, alkylphenols, glycols, polyethers, polyglycols, polyglycol derivatives, ethylene oxide-propylene oxide copolymers, protein/fatty acid condensates, alkyl benzenesulphonates, alkyl naphthalenesulphonates, ligninsulphonates, sulphated polyglycol ethers, melamine/formaldehyde condensates, naphthalene/formaldehyde condensates, gluconic acid, polyacrylates, polycarboxylate ethers, polyhydroxy compounds, polyhydroxyamino compounds or solutions or mixtures or suspensions or emulsion thereof.

5. The pigment granules according to claim 1, wherein the pigment granules contain auxiliaries in a total amount of 0.001 to 10% by weight based on the total amount of all the organic and/or inorganic pigment.

6. The pigment granules according to claim 5, wherein the pigment granules contain auxiliaries in a total amount of 0.1 to 5% by weight, based on the total amount of all the organic and/or inorganic pigments.

7. The pigment granules according to claim 1, wherein the at least one further non-fluorescing organic and/or inorganic pigment forming the at least one outer layer is not more than four times the weight, based on the weight of the pressed or briquetted core.

8. The pigment granules according to claim 7, wherein the at least one further non-fluorescing organic and/or inorganic pigment forming the at least one outer layer is not more than the same weight, based on the weight of the pressed or briquetted core.

9. The pigment granules according to claim 1, wherein the pressed or briquetted core and the at least one outer layer each comprise an inorganic or an organic pigment.

10. The pigment granules according to claim 9, wherein the pressed or briquetted core and the at least one outer layer contain the same pigment and wherein the pressed or briquetted core and the at least one outer layer contain an auxiliary differing in amount or type.

11. The pigment granules according to claim 9, wherein the pressed or briquetted core and the at least one outer layer contain the same pigment and wherein the pigment in at least one outer layer is not pressed and briquetted.

12. The pigment granules according to claim 1, wherein the pressed or briquetted core and the at least one outer layer each contain a plurality of non-fluorescing inorganic pigments and/or in each case a plurality of non-fluorescing organic pigments.

13. The pigment granules according to claim 12, wherein the pressed or briquetted core and the at least one outer layer contain the same non-fluorescing organic and/or inorganic pigments and wherein the pressed or briquetted core and the at least one outer layer have at least one auxiliary differing in amount or type.

14. The pigment granules according to claim 12, wherein the pressed or briquetted core and the at least one outer layer contain the same non-fluorescing organic and/or inorganic pigments and wherein the further organic and/or inorganic pigments in the at least one outer layer is applied by granulation and is not pressed or briquetted.

15. The pigment granules according to claim 1, wherein the pressed or briquetted core comprises auxiliaries other than those in the at least one outer layer.

16. The pigment granules according to claim 1, wherein the pressed or briquetted core is coated one or more times with the at least one auxiliary.

17. The pigment granules according to claim 1, wherein the at least one outer layer is coated one or more times with the at least one further auxiliary.

18. The pigment granules according to claim 1, wherein the at least one outer layer comprises an outermost layer and said outermost layer is coated one or more times with the at least one further auxiliary.

19. The pigment granules according to claim 1, wherein both the organic and inorganic pigment is present and the pigment granules consisting of inorganic pigment have a bulk density in the range of 0.3 to 4.0 g/cm$^3$ and the pigment granules consisting of organic pigment have a bulk density of 0.1 to 2.5 g/cm$^3$.

20. The pigment granules according to claim 19, wherein the inorganic pigment has a bulk density in the range of 0.5 to 2.0 g/cm$^3$.

21. The pigment granules according to claim 1, wherein at least 85% of the pigment granules have a particle size in the range of 100 to 1500 μm.

22. The pigment granules according to claim 1, wherein the pigment granules have a residual water content of less than 4% by weight.

23. The pigment granules according to claim 22, wherein the pigment granules have a residual water content of less than 2% by weight.

24. The pigment granules according claim 1, wherein the pigment granules additionally comprise preservatives, antifoams, retention agents, antisettling agents and/or fragrances.

25. A process for the preparation of the pigment granules according to claim 1, comprising:
 a) mixing at least one organic and/or inorganic pigment with at least one auxiliary to form a first mixture;
 b) pressing or briquetting the first mixture thereby forming scabs;
 c) comminuting the scabs thereby forming nuclei and powder;
 either d1 or d2:
 d1) separating the nuclei from the powder, wherein a plurality of fractions are formed, selecting a fraction in the range of 80 μm to 2000 μm to serve as a core fraction
 d2) applying the powder formed on comminution to a core fraction, said core fraction being the nuclei, by granulation by subsequent rolling;
 e) applying at least one outer layer by granulation by subsequent rolling to the product obtained with the addition of at least one further non-fluorescing organic and/or inorganic pigment,
  (i) mixing, prior to applying step e), the further non-fluorescing organic and/or inorganic pigment with one or more auxiliaries and/or
  (ii) adding one or more auxiliaries during the subsequent rolling and/or (iii) pressing or briquetting the further non-fluorescing organic and/or inorganic pigment and at least one or more auxiliaries, thereby, forming subsequently rolled granules.

26. The process according to claim 25, wherein the pressing or briquetting step b) is effected by means of a roll press or matrix press and at nip forces of 0.1 to 50 kN/cm.

27. The process according to claim 25, wherein the pressing or briquetting step b) is effected at nip forces of 0.1 to 20 kN/cm.

28. The process according to claim 25, wherein a plurality of pressing or briquetting steps b) are effected directly in succession, identical or different pressing or briquetting units being used and the pressing or briquetting steps being carried out at identical or different nip forces in the range of 0.1 to 50 kN/cm.

29. The process according to claim 28, wherein the pressing or briquetting steps are carried out at identical or different nip forces in the range of 0.1 to 20 kN/cm.

30. The process according to claim 25, wherein, in step c), the comminution is effected by means of a sieve having a mesh size of 0.5 to 4 mm as a comminuting unit.

31. The process according to claim 30, wherein the mesh size is 1 to 2 mm.

32. The process according to claim 25, wherein a plurality of comminution steps c) by means of a sieve is effected directly in succession, different mesh sizes of the sieve being used and, in the last comminution step, a sieve having a mesh size of 0.5 to 4 mm being used.

33. The process according to claim 32, wherein the mesh size is 1 to 2 mm.

34. The process according to claim 25, wherein a plurality of comminution steps c) is effected directly in succession, different comminution units being used.

35. The process according to claim 25, wherein, before the comminution in step c), the scabs from b) are separated into two fractions, namely, a coarse fraction, in which at least 85% of the particles are greater than 500 µm which is fed to step c) and comminuted in one or more steps and a fine fraction which is fed to step d1) in order to be separated again into two or more fractions in step d1), separately from or together with the nuclei and the powder from c), to form the core fraction.

36. The process according to claim 35, wherein at least 85% of the particles are larger than 600 µm.

37. The process according to claim 25, wherein the nuclei and powder of the comminuted product from step c) are separated into two fractions in step d1), a fine fraction that is smaller than 80 µm which is removed or recycled to the process and a coarse fraction that is greater than 80 µm which serves as the core fraction.

38. The process according to claim 37, wherein the fine fraction is smaller than 250 µm and is removed or recycled to the process and the coarse fraction is greater than 250 µm and serves as the core fraction.

39. The process according to claim 25, wherein the nuclei and powder of the comminuted product from c) are separated into three fractions in step d1), a fine fraction and a coarse fraction which are both removed or recycled and a medium fraction that is in the range of 80 to 2000 µm and serves as the core fraction.

40. The process according to claim 39, wherein the medium fraction is in the range of 250 to 1000 µm.

41. The process according to claim 25, wherein, before step e), the core fraction from step d1) is separated into two fractions, a fine fraction and a coarse fraction which are removed or recycled and a fraction in the range of 80 to 2000 µm being fed to step e).

42. The process according to claim 41, wherein a fraction in the range of 100 to 1500 µm is fed to step e).

43. The process according to claim 25, wherein, before step e), the core fraction from step d1) is separated into three fractions, a fine fraction and a coarse fraction which are removed or recycled and a medium fraction in the range of 80 to 2000 µm that is fed to step e).

44. The process according to claim 43, wherein the medium fraction is in the range of 100 to 1500 µm.

45. The process according to claim 25, wherein the at least one further organic and/or inorganic pigment, added to step e), is not more than four times the weight of the core fraction used in step e).

46. The process according to claim 25, wherein the at least one further organic and/or inorganic pigment, added to step e), is not more than the same weight.

47. The process according to claim 25, wherein the at least one further organic and/or inorganic pigment of step e) is different from the at least one organic and/or inorganic pigment of step a).

48. The process according to claim 25, wherein a plurality of the at least one further organic and/or inorganic pigment are used in succession in step e).

49. The process according to claim 25, wherein the at least one further organic and/or inorganic pigment of step e) is mixed prior to step e).

50. The process according to claim 25, wherein the at least one further organic and/or inorganic pigment of step e) is mixed prior to step e) with one or more auxiliaries.

51. The process according to claim 25, wherein the rolled granules obtained from step e) are separated into two fractions before step f), and only the fraction in which the particles are greater than 80 µm is fed to step f), while the remaining fraction is removed from the process or recycled.

52. The process according to claim 51, wherein only the fraction in which the particles are greater than 250 µm is fed to step f).

53. The process according to claim 25, wherein the rolled granules obtained from step e) are separated into three fractions before step f), and only the fraction in which at least 85% of the particles are greater than 80 µm or are in the range of 80 to 3000 µm is fed to step f), while the remaining fractions are removed from the process or recycled.

54. The process according to claim 53, wherein only the fraction in which at least 85% of the particles are greater than 100 µm or are in the range of 100 to 1500 µm is fed to step f).

55. The process according to claim 25, wherein the rounding step d1)(i) is effected on a rotating disc (pelletizing disc), in a coating drum or in a rotating drum (pelletizing drum), in a screen unit or in a fluidized bed or in a fluid bed.

56. The process according to claim 25, wherein the subsequent rolling step of d2) is effected on a rotating disc (pelletizing disc), in a coating drum or in a rotating drum (pelletizing drum).

57. The process according to claim 25, wherein the further subsequent rolling step of e) is effected on a rotating disc (pelletizing disc), in a coating drum or in a rotating drum (pelletizing drum).

58. The process according to claim 25, wherein one or more drying steps are additionally effected.

59. A process of coloring building materials comprising concrete, cement mortar, plaster and asphalt, and coloring organic media comprising finishes, plastics and color pastes, and preparing emulsion paints and slurries, comprising: mixing the pigment granules according to claim 1 with the building materials, organic media and emulsion paints and slurries.

60. A process for coloring building materials comprising cement or asphalt with the pigment granules according to claim 1, comprising mixing the pigment granules with the building materials in an amount of 0.1 to 10% by weight, based on cement or, in the case of asphalt, based on the total mixed material.

61. A process for coloring building materials with the pigment granules according to claim 1, comprising suspending the pigment granules in water and then mixing the pigment granules with the building materials.

62. A process for coloring organic media with the pigment granules according to claim 1, comprising mixing the pigment granules with the organic media.

63. The process according to claim 62, wherein the organic media are plastics.

64. The process according to claim 63, wherein the plastics are thermoplastics, thermosetting plastics and/or elastomers.

65. The process according to claim 62, wherein the pigment granules are mixed with liquid plastics.

66. The process according to claim 62, wherein the organic media are polymers having rubber-elastic properties.

67. The process according to claim 62, wherein the organic media are powder coating materials.

68. A process for coloring emulsion paints with the pigment granules according to claim 1, comprising mixing the pigment granules with the emulsion paints.

69. The process according to claim 25, wherein step d1) further comprises the following steps in no particular order:
(i) rounding said core fraction and/or
(ii) coating said core fraction with at least one further auxiliary thereby
forming a product and allowing the product to remain in the production process while a fraction, other than the core fraction, is removed from the process or recycled.

70. The process according to claim 25, wherein step d2) further comprises:
adding one or more auxiliaries and it being possible for the product obtained and completely applied by granulation to be coated with one or more further auxiliaries.

71. The process according to claim 25, further comprising:
a) coating the subsequently rolled granules with additional auxiliaries.

\* \* \* \* \*